UNITED STATES PATENT OFFICE.

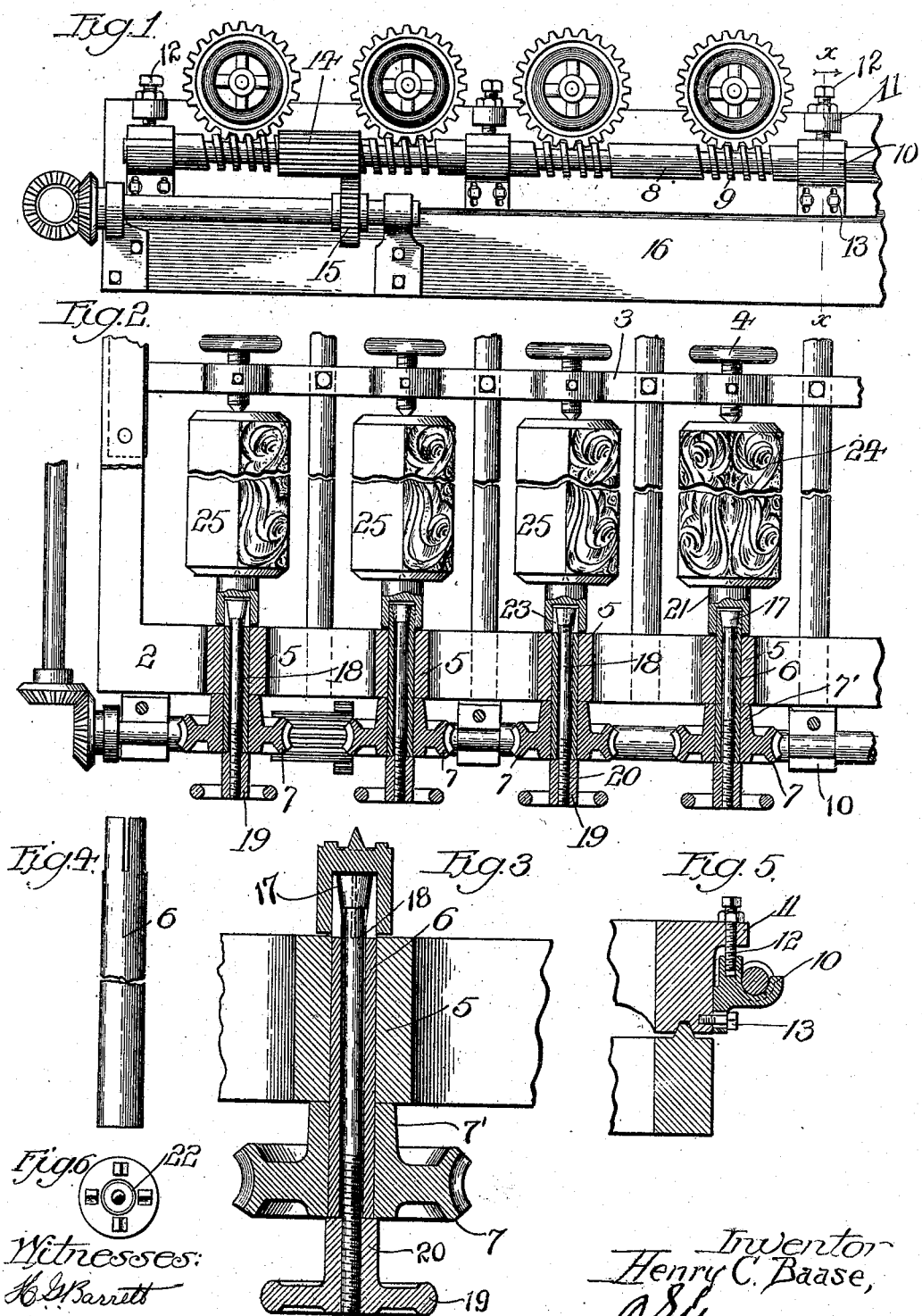

HENRY C. BAASE, OF INDIANAPOLIS, INDIANA, ASSIGNOR TO UNIVERSAL AUTOMATIC CARVING MACHINE CO., OF CHICAGO, ILLINOIS, A CORPORATION OF NEW JERSEY.

WORK-HOLDER FOR CARVING-MACHINES.

No. 921,058.           Specification of Letters Patent.           Patented May 11, 1909.

Application filed November 21, 1903. Serial No. 182,201.

*To all whom it may concern:*

Be it known that I, HENRY C. BAASE, a citizen of the United States, residing at Indianapolis, in the county of Marion and State of Indiana, have invented certain new and useful Improvements in Work-Holders for Carving-Machines, of which the following is a specification.

My invention relates to carving-machine tables and to means for securing the pattern or the work or both thereon.

Automatic carving machines, to which my invention has special reference, are capable of simultaneously producing a large number of copies of a given pattern. The pattern is arranged upon the feed-table of the machine and the pieces of work are usually grouped upon opposite sides of the pattern. The pattern may be flat or it may be round. In either case, it is necessary to provide means for rigidly holding both the pattern and the work upon the table, and if the pattern be round it is necessary to provide means for rotating it and the work, while being operated upon by the carving tools. Because of the necessity for adapting the table to both kinds of work, it has been customary to hold the individual pieces by tail-stocks and head-stocks provided on the table. The chucks heretofore used in the head-stocks resembled those of wood-working lathes, having been provided ith holding-spurs or clamps. The projections on such chucks sink into the ends of the pieces of wood to securely hold the same against rotation with respect to their chucks. A series of such chucks have been arranged on a single feed-table and means have been provided for rotating the chucks simultaneously. Now in operating carving machines, it is frequently necessary to re-cut pieces, and some pieces are always re-placed in the same or another carving machine to be finished. It is obvious that pieces thus re-placed must correspond exactly to the pattern in relative positions; otherwise, instead of simply re-tracing and perfecting a previously cut panel, the initial design would be destroyed. But it has been practically impossible to so construct and arrange the chucks upon carving machines as to permit the interchange of the work from one chuck to another, yet the chucks so closely correspond that it is difficult to make new chuck-marks in an old piece of work, and this inability to easily re-set pieces in the machine is recognized as an impediment in the use of the machine.

The object of my invention is to improve the construction and arrangement of the chucks or work-holding devices upon carving machines, and the particular object of the invention is to provide a plurality of chucks that are independently adjustable, to the end that any chuck of a series may be partially rotated to properly place a piece of work without disturbing the other chucks or the mechanism which connects the several chucks.

Another object of my invention is to provide an improved adjustable chuck, considered as a separate and individual mechanism.

My invention consists, generally, in a feed-table, in combination with a plurality of work-holding chucks, driving means connecting said chucks, and each of said chucks comprising a revoluble part connected with said driving means and an independently rotatable part or chuck proper; and further, my invention consists in various details of construction and in combinations of parts, all as hereafter described and particularly pointed out in the claims.

My invention will be more readily understood by reference to the accompanying drawings, forming a part of this specification, and in which:—

Figure 1, is an end view of the feed-table equipped in accordance with my invention; Fig. 2, is a plan view thereof showing the several chuck shafts and head stock in horizontal section; Fig. 3 is an enlarged horizontal section of one of the chucks; Fig. 4, is a detail view of the chuck-stem or shaft; Fig. 5, is a sectional view of one of the hangers for the chuck-driving shaft, on line *x—x* of Fig. 1 and Fig. 6 is an end view of the chuck proper.

As shown in the drawings, 2, represents the feed-table, and 3, represents the tail-stock bar that is movable toward and from the front of the table. In this are a number of tail-stocks, 4. The front rail of the table is provided with a plurality of horizontal bearings, 5, 5, and in each of these is a short tubular shaft, 6. These are in line with the tail-stocks, and on the outer end of each shaft, 6, is a worm-gear, 7, that is keyed or otherwise secured thereto. The hubs, 7', of the gears, 7, work against the ends of the bearings or head stocks, 5, and the gears and the shafts, 6, are controlled by a worm-shaft, 8. This shaft is arranged below the gears and the worms, 9, intermesh with the gears so closely that they prevent lost motion in any direction between the parts. To insure this close engagement between the worm-shaft and the worm-gears, I arrange said shaft, 8, in small, open-topped hanger-bearings, 10, which are vertically adjustable. The table is provided with a lug, 11, above each of these bearings, and each has a jack-screw, 12, by which it may be raised or lowered. When one has been adjusted, it is secured by the binding-bolts, 13, placed in the depending flange of the bearing, 10. By means of these devices, the shaft may be elevated to take up all wear in the worm-gears, which gears must be incapable of rotation except by the worm-shaft. Any suitable means such as the long gear pinion, 14, on the shaft, 8, and a driving pinion, 15, on the bed, 16, of the feed-table, may be employed for actuating the gears and the chucks associated therewith. The pinion, 14, permits the transverse adjustment of the table on the bed, and the pinion, 15, on said bed, is intermittently driven by the longitudinal movement of the bed. The rear ends of the tubular shafts, 6, of the head-stocks, are tapered to receive the tapered plugs, 17. Said inner ends of the shafts are split or slotted to permit the expansion thereof, and said plugs, 17, are formed upon or secured to the spindles, 18, that extend through the hollow-shafts; each spindle is threaded at its outer end and on each is a hand-wheel, 19, having an internally threaded boss or hub, 20. It is obvious that when the hand-wheel, 19, is turned, the spindle will be either drawn forward or loosened in the shaft, 6, thereby either drawing the plugs, 17, into the tapered end of the shaft to expand the same or permitting said plug to slip back therein and permit the inner end of the shaft to contract. The chucks, 21, are faced by spurs, 22, of any suitable design and arrangement and are provided with the central recesses, 23, to fit over the expanding ends of the shafts, 6. The connection between the head-stock shaft and the chuck is extremely strong and rigid when tightened. I term same an expanding frictional joint. The chucks bear against the inner ends of the bearings, 5, and the shafts are therefore relieved from the thrust of the tail-stock screws.

In Fig. 2 of the drawings, 24, represents the pattern, either flat or cylindrical, and 25, 25, 25 illustrate partially completed pieces of work. As shown, the pattern and pieces of work are set between respective chucks and tail-stocks, and it is obvious that when the hand-screw or wheel, 19, of any chuck is loosened, said chuck may be rotated about its shaft, 6, as needed to properly place the piece of work. When a piece of work has been placed in the machine and after it has been set to the exact position required, the tightening of the hand-screw operates to firmly clamp the chuck upon the end of its shaft, and this tightening is accomplished without danger of rotating or altering the position of the chuck and the piece held thereby, with respect to the pattern. In this simple manner I adapt the carving machine to receive and finish old pieces of work, inasmuch as they may be placed upon the old chuck-marks without reference to the pattern and may thereafter be individually adjusted to their proper positions by means of the separately operable chucks. It will be observed that this is accomplished without any manipulation of the chuck driving means or any change in the relations or positions of the worm-shaft and the gears.

It is obvious that chucks of any desired type or design may be employed with my invention so long as the same are provided with the central recesses to fit the expanding shafts.

Numerous modifications of my invention are contemplated therein and will suggest themselves to one skilled in the art. I therefore do not confine the invention to the specific constructions herein shown and described.

Having thus described my invention, I claim as new and desire to secure by Letters Patent:—

1. In a carving machine, a feed-table, in combination with a bed, whereon said table is transversely adjustable, the chuck-operating shaft extending transversely of said table, a shaft parallel therewith, upon said bed, a long pinion on said chuck-operating shaft, a coöperating gear upon said parallel shaft and means for driving the latter, substantially as described.

2. In a head-stock, a suitable bearing, in combination with the tubular shaft, 6, having a slotted and conically recessed end, a conical plug, 17, in said end, a plug-operating stem in said shaft, an operating-device therefor, the centrally recessed chuck revoluble on the slotted end of said shaft and means for rotating said shaft, substantially as described.

3. In a carving machine, a feed table provided with a plurality of parallel horizontal bearings, in combination with a hollow shaft in each said bearing, means for simultaneously rotating said hollow shafts, each said shaft having a split or divided inner end, a chuck normally revoluble upon the inner end of each said shaft and adapted to be clamped thereto by the expansion of its end, a conical plug in each shaft for expanding the inner end thereof to secure the respective chuck, a stem extending from each plug and having a threaded end projecting from the outer end of the respective shaft and a threaded hand wheel or nut on each stem, as and for the purpose specified.

In testimony whereof, I have hereunto set my hand and seal this 30th day of October, A. D. 1903, in the presence of two witnesses.

HENRY C. BAASE. [L. S.]

Witnesses:
MARTIN D. TAMBLE,
ELIZABETH RAINEY.